United States Patent [19]
Goerke

[11] Patent Number: 6,122,524
[45] Date of Patent: Sep. 19, 2000

[54] MULTIPLE SERVICE USER TERMINAL

[75] Inventor: Thomas Goerke, Stanmore, United Kingdom

[73] Assignee: International Maritime Satellite Organization, London, United Kingdom

[21] Appl. No.: 08/970,156

[22] Filed: Nov. 13, 1997

[30] Foreign Application Priority Data

Nov. 13, 1996 [GB] United Kingdom ................... 9623654

[51] Int. Cl.[7] ................................................. H04B 1/46
[52] U.S. Cl. ................. 455/552; 455/12.1; 455/427; 455/82; 455/575; 343/895; 333/129; 333/132
[58] Field of Search ................................. 455/19, 71, 77, 455/78, 82, 83, 550–553, 101, 102, 125, 131, 132, 134, 179.1, 435, 13.2, 6.1, 1, 427, 575; 343/702, 796, 822, 725–728, 807, 895, 858; 333/126, 124, 129, 132

[56] References Cited

U.S. PATENT DOCUMENTS

| | | | |
|---|---|---|---|
| 3,562,597 | 2/1971 | White | 455/82 |
| 5,170,490 | 12/1992 | Cannon et al. | 455/84 |
| 5,303,396 | 4/1994 | Ooyagi et al. | 455/134 |
| 5,386,203 | 1/1995 | Ishihara | 333/129 |
| 5,479,178 | 12/1995 | Ha | 343/702 |
| 5,572,227 | 11/1996 | Pal et al. | 343/895 |
| 5,634,203 | 5/1997 | Ghaem | 455/134 |
| 5,652,599 | 7/1997 | Pitta et al. | 343/858 |
| 5,678,199 | 10/1997 | Birth et al. | 455/82 |
| 5,732,359 | 3/1998 | Baranowsky, II et al. | 455/435 |

*Primary Examiner*—Doris H. To
*Attorney, Agent, or Firm*—McDermott, Will & Emery

[57] ABSTRACT

A user terminal in the form of a handset 1 is disclosed wherein a common antenna 3 is operative to provide transmission and reception on a plurality of selectable services at different frequencies, the antenna being resonant and matched for at least one of the services, and non-resonant and unmatched for other services. The user terminal handset 1 employs a common antenna 3 directly for that service or those services for which the antenna 3 is matched and resonant. The user terminal handset 1 employs the common antenna 3 unmatched and non-resonant for those services whereon unmatched non-resonant antenna use is acceptable. The user terminal handset 1 comprises means, for approximately or precisely adjusting the match to the common antenna 3 for other services.

5 Claims, 6 Drawing Sheets

MULTIPLE SERVICE USER TERMINAL

The present invention relates to user terminals for communication systems. In particular, it relates to a user terminal, in the form of a radio telephone, for use in an environment where more than one radio telephone service might be available.

It is known in the art to provide a user terminal for a radio telephone system. This can range from a large and complex vehicle-carried unit for use on a ship, aircraft or land vehicle, right down to a pocketable handset such as a cellular telephone.

It is a recent development that direct satellite communications, where a user terminal may engage in radio contact with the satellite, which in turn is in communication with an earth station, has become possible. Satellite communication requires a greater efficiency from the antenna in a user handset than has hitherto been required in terrestrial radio telephone systems. Whereas, transmission power, in terrestrial radio telephone systems has been sufficient that the quality of the antenna is only of marginal concern, in satellite communications, because of the distance between the user terminal and the satellite, it is necessary that the antenna be efficient. In technical terms, it is necessary that the antenna is "matched".

An antenna is said to be "resonant" at a particular frequency when the reactive term in its input impedance reduces to zero and a purely resistive term remains. This is not the same as being "matched" since the remaining resistive term may differ greatly from the output resistance of the transmitter and from the input resistance of the receiver. To be matched, an antenna must not only have effectively zero reactance in its input impedance, but must also have a resistive term that is substantially equal to the output resistance of the transmitter and substantially equal to the input resistance of the receiver. Under these circumstances, optimal power transfer is possible, the transmitter being capable of delivering maximun energy to the antenna, and the antenna being capable of delivering incident energy to the receiver.

An antenna is matched, precisely, only at one or more spot frequencies. The antenna is required to operate on one or more bands of frequencies. At the edges of any band, the matching is less efficient than at the spot frequencies and optimal transfer of the total deliverable power can no longer take place. Nonetheless, the antenna is deemed to be operating at a frequency where it is matched. In order to avoid confusion, it is necessary to define what is meant by "matched" when the term really means a range of approximate matching.

The term matched, herein before and hereinafter, when used in connection with an antenna, is defined as that condition where, when in use at a particular frequency, 50 per cent or more of the maximum deliverable energy, generated by a transmitter, is delivered for radiation by the antenna and, 50 percent or more of the maximum deliverable energy, received by the antenna, is transferred to a radio receiver.

There is an element of uncertainty in all mobile radio communications. Terrestrial services such as GSM, Analogue cell phones, etc. have areas of zero or poor coverage. Likewise, a particular satellite communication system may, at any particular time, be unavailable to the user because of obstructions to the radio signal to and from the satellite, instant non-availability of a satellite, and so on.

For greatest convenience, the user must have, available to him, a range of different services upon which he can call. In the event that one service is not available, another may be available. Ideally, the user would be able to select between different terrestrial services and from among different satellite services.

At present, a separate user terminal in the form of a radio telephone handset is necessary for each different service. The services are provided on different frequencies. Even although, with improved miniaturisation, it might be possible to provide a user radio telephone handset which would function on more than one service, the difference in frequency between the services poses a problem. The requirement for size and portability means that the user terminal cannot comprise a multiplicity of different antennae. Likewise, the possible provision of exchangeable antennae would mean that the user terminal comes provided with additional elements which can be lost and which are inconvenient to plug in when required.

The present invention seeks to overcome these problems and to provide a user terminal wherein on-demand access to plural services, otherwise known as "roaming" becomes a practical possibility.

The present invention consists in a user terminal for use as a radio telephone for use in the communication system; said communication system including a plurality of services; said plurality of services being provided on a plurality of frequencies; said user terminal comprising a common antenna; said user terminal being selectably operable to access a selectable one of said plurality services; said common antenna being matched on the frequency of at least one of said plurality of services; said user terminal being characterized by said common antenna being operable to act as a matched antenna for at least one of said plurality of services, and operable to act as an unmatched antenna for those of said plurality of services for whose frequencies said common antenna is not matched.

The invention also provides a user terminal including means for tuning the antenna, responsive to the selection of at least one other of the plurality of services, operative to alter the frequency at which matching occurs of the common antenna towards the frequency of the at least one other of the plurality of services.

The invention further provides that the use terminal comprises a controller for monitoring the amplitude of the signals on the common antenna and for controlling the tuning means, which includes an electrically controllable element, to alter the frequency at which matching occurs of the antenna towards the frequency of the at least one other service.

The invention further provides that, where the at least one other service employs a first frequency for radio reception and a second frequency for radio transmission, the tuning element is operative to move the frequency at which matching occurs of the common antenna towards the first frequency when the user terminal is receiving radio signals and towards the second frequency when the user terminal is transmitting radio signals.

The invention further provides that the common antenna comprises plural conductors on a common former, and that the user terminal comprises switching means to select one or more of the plural conductors for use on a particular service.

The invention is further explained, by way of an example, by the following description, read in conjunction with the appended drawings, in which.

Figure 1:
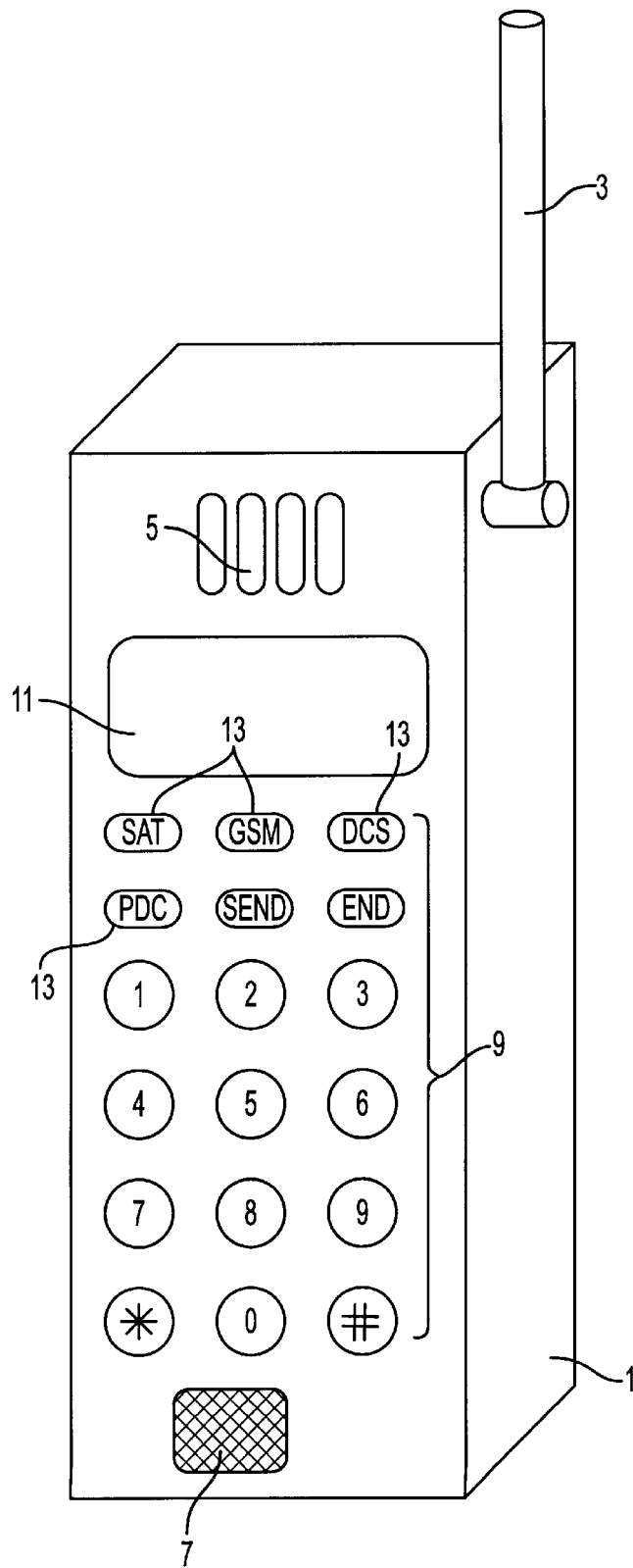
FIG. 1 is a projected view of a radio telephone handset (user terminal) suitable for use with the present invention.

Attention is drawn to FIG. 1. A radio telephone handset 1 comprises an antenna 3, an earpiece 5, a microphone 7, a keyboard 9 and a display 11. In addition to the usual buttons found on the keyboard 9, the service selection buttons 13 are also provided. In the example given, the buttons 13 may selectably activate the handset 1 for satellite communication, GSM communication, DCS communication or PCS communication. Each of these selectable services operates on its own individual frequency. For example, satellite communications have been allocated a band where transmission occurs between the frequencies of 1985 MHz and 2015 MHz and reception occurs between the frequencies of 2170 MHz and 2200 MHz. GSM communications occur on a band of frequencies close to 900 MHz. DCS communications occur on a band of frequencies close to 1800 MHz. PCS communications occur on a band of frequencies close to 1900 MHz. The handset 1 operates with these and other selectable services using the common antenna 34 for all of the services.

Those skilled in the art will be aware that there are many other different services, not mentioned in relation to the handset 1, which may also be used with the present invention.

Figure 2:
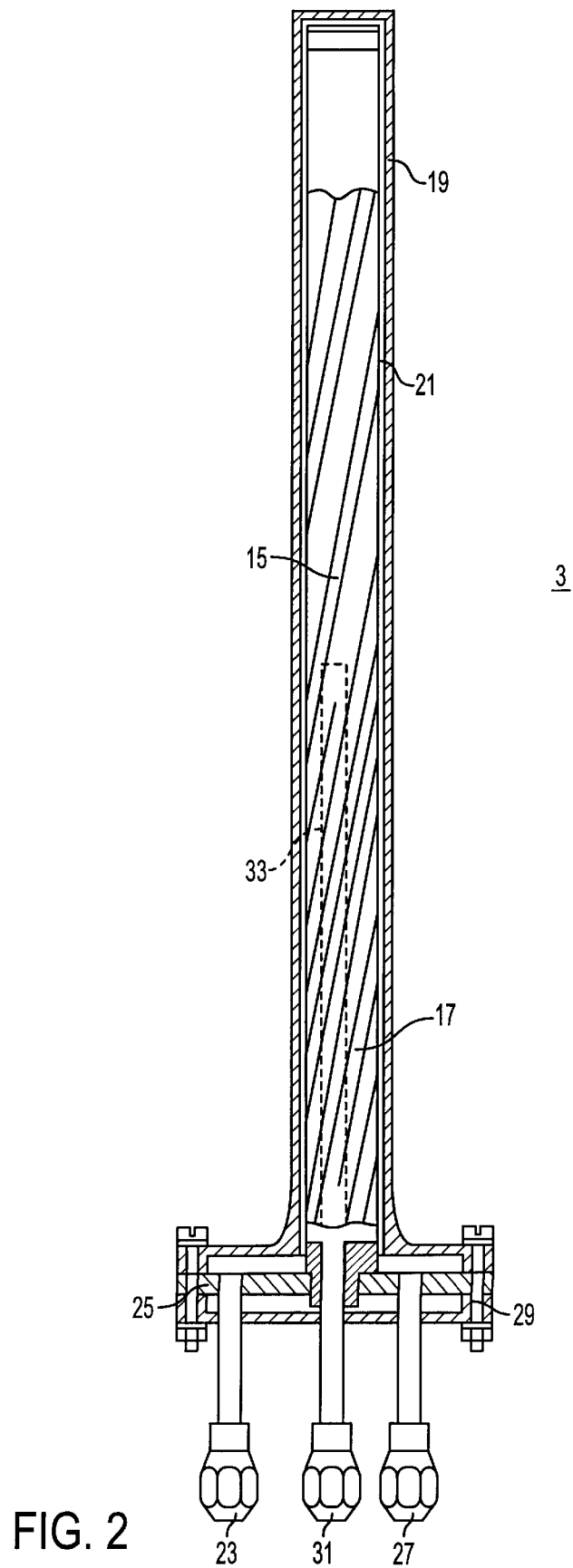
FIG. 2 is a cross sectional view of an exemplary antenna, suitable for use with the present invention.

FIG. 2 is a cross sectional view of an exemplary antenna 3 suitable for use in the present invention. The example shown is not intended to be restrictive, merely to represent one example of a suitable antenna.

The antenna shown in FIG. 2 is the subject of European patent application 0715369A1, a published European patent application entitled "A multi-band antenna system", and which is included herein by reference.

Figure 3:
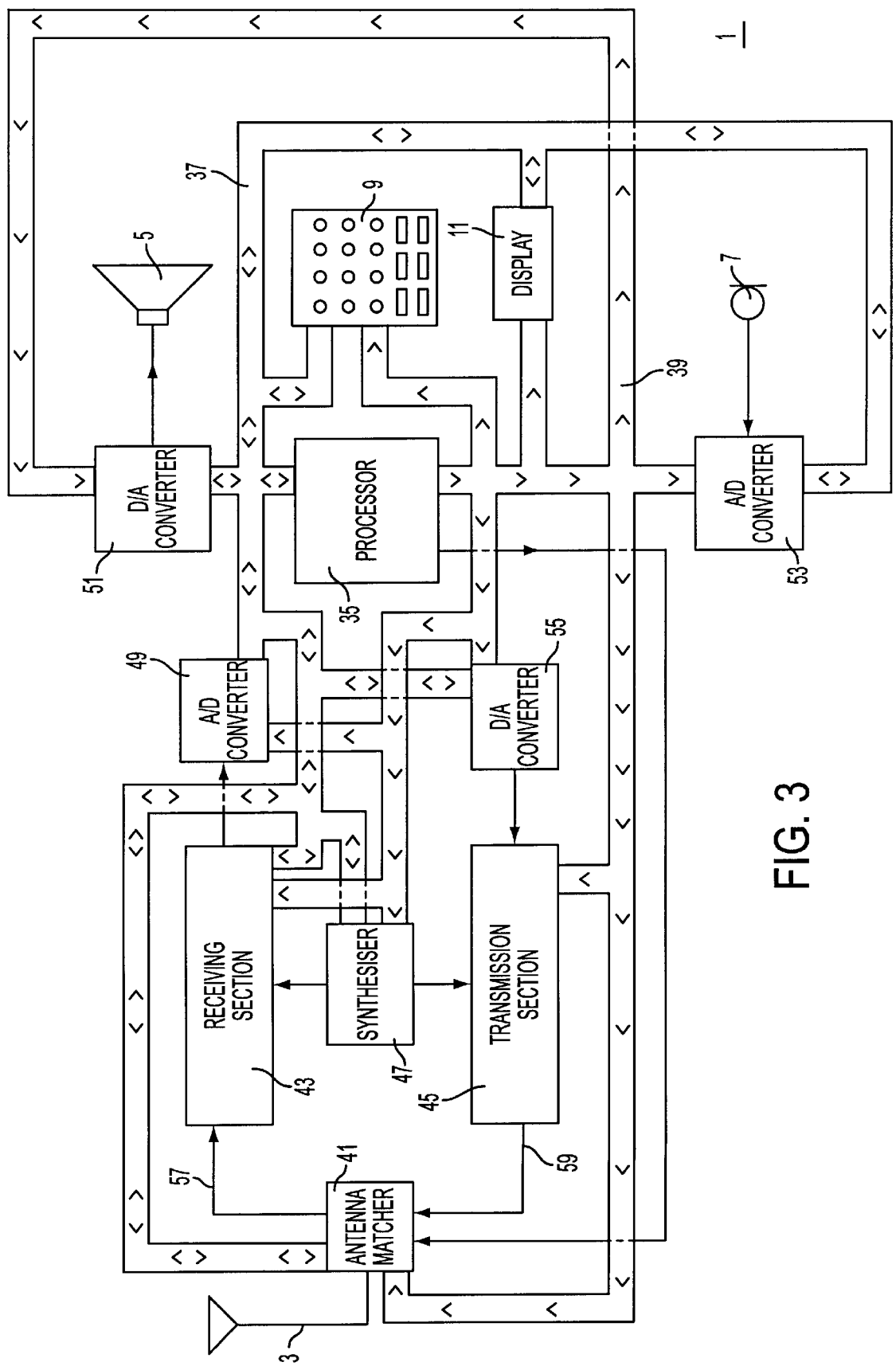
FIG. 3 is a schematic block diagram of a generic user terminal, suitable for use in the present invention.

The antenna 3, shown in FIG. 3, is designed to operate on the L-band, S-band and the UHF band. The antenna 3 comprises a L-band antenna element 15, and an S-band antenna element 17 provided in the form of quadrifiliar helices spaced from each other on the surface of a hollow cylindrical insulator 19. A UHF band antenna element 21 is provided in the form of a caged dipole on the surface of the hollow cylindrical insulator 19. The L-band antenna 15 has its input connected to a first conductor 23 through an L-band feed network card 25. The S-band antenna element 17 is connected to a second conductor 27 through an S-band feed network card 29. The UHF band antenna element is connected to a third conductor 31 through a split sheath balun 33 provided along the axis of the hollow cylindrical insulator (19).

The antenna 3 shown is thus resonant and matched only at particular narrow bands of frequencies, one band of matched frequencies on each of the S-band, L-band and the UHF band. The antenna 3, when matched, is intended to receive energy For transmission and to transfer received radio energy to a receiver with reasonable efficiency. This reasonable efficiency only occurs across a very narrow band of frequencies to be found in each of the S-band, the L-band and the UHF band. Beyond these bands of frequencies, where other services may be provided, the antenna 3 is out of resonance and poorly matched so that only a small fraction of the energy delivered thereto for transmission is actually transmitted and only a small fraction of the energy delivered thereto by incident radio waves is transferred to the input of a receiver. In particular, the UHF antenna element 21 can be omitted and the measures, described hereafter, used to enable utility in the UHF band. For the purpose of the following description of the preferred embodiment, it is assumed that the UHF antenna element is present, but only by way of an example.

In the operation of the present invention it is not necessary that the antenna be resonant and matched on three bands of frequencies, simply that the antenna 3 should be resonant and matched on at least one band of frequencies. This will become clear from the following disclosure.

FIG. 3 is a schematic block diagram of a user terminal one such as is shown in FIG. 1.

A controlling processor 35 provides a data bus 37 and an address bus 39 to each of various elements within the handset 1. Those skilled in the art will realise that the controlling processor 35 can be implemented as a standard Von Neuman processor and will be well acquainted with external control which can be imposed by such a processor 35 via a data bus 37 and an address bus 39. The antenna 3 is selectively coupled via an antenna matcher 41 either to a receiving section 43 or to a transmitting section 45. A synthesiser 47 is under the control of the controlling processor 35 to provide the receiving section 43 and the transmitting section 45 with radio frequency signals capable of causing the receiving section 43 to receive on a desired frequency and transmitting section 45 to transmit on a desired frequency. While only one synthesiser 47 is shown, it is to be understood that the receiving section 43 could comprise its own dedicated synthesiser and that the transmitting section 45 could also contain its own dedicated synthesiser.

The receiving section 43 changes the frequency of the incoming radio wave from the antenna 3 to an intermediate frequency which it then filters and amplifies. The amplified and filtered intermediate frequency signal from the receiving section 43 is provided as an input to a receiving analogue to digital converter 49 whose output, a succession of binary digits representative of the instant amplitude of the output of the receiving section 43, is coupled via the data bus 37 under control from the address bus 39, as an input to the controlling processor 35. The controlling processor 35 converts the output of the receiving analogue-to-digital converter 49 into intelligible signals by executing decoding and demodulating algorithms. In the event that the signal from the receiving analogue-to-digital converter 49 is representative of sound, the controlling processor sends a succession of binary digits to an earpiece digital-to-analogue converter 51 which supplies an analogue signal sufficient to drive the earpiece 5. The microphone 7 provides an analogue input to a microphone analogue-to-digital converter 53 whose output, a stream of binary digits representative of the instant amplitude of the analogue signal coming from the microphone 7, is transferred to the controlling processor 35 via the data bus 37 under control from the address bus 39.

When transmitting, the controlling processor 35 activates the antenna matcher 41 to select the transmitting section 45, and then passes a stream of binary digits to a transmitting digital-to-analogue converter 55 whose output, an analogue signal representative of the instant value of the binary number presented on the data bus 37 as an input, is coupled as a modulating signal to the transmitting section 45. Alternatively, if it is desired to employ digital modulation, the controlling processor 35 bypasses the transmitting digital-to-analogue converter 55 and sends modulation control signals directly to the transmitting section 45 via the data bus 37 under control of the address bus 39.

The exact mode of operation of the controlling processor 35 is selected by the keyboard 9, again coupled to the controlling processor 35 via the data bus 37 and the address bus 39.

The display 11 is also driven, by the controlling processor 35, via the data bus 37 and the address bus 39.

The controlling processor 35 has been shown to control all of the various elements 41, 43, 45, 47, 49, 51, 53, 55 by means of the data bus 37 and address bus 39. It is to be understood that the functions of the data bus 37 and the address bus 39 can be replaced by discreet control lines, originating from within the controlling processor 35, rather than by provision of discreet buses 37, 39. Such a structure is shown simply to illustrate one exemplary manner in which a controlling processor 35 may be employed to control all of the various elements 41, 43, 45, 47, 49, 51, 53, 55 in the handset 1.

Figure 4:
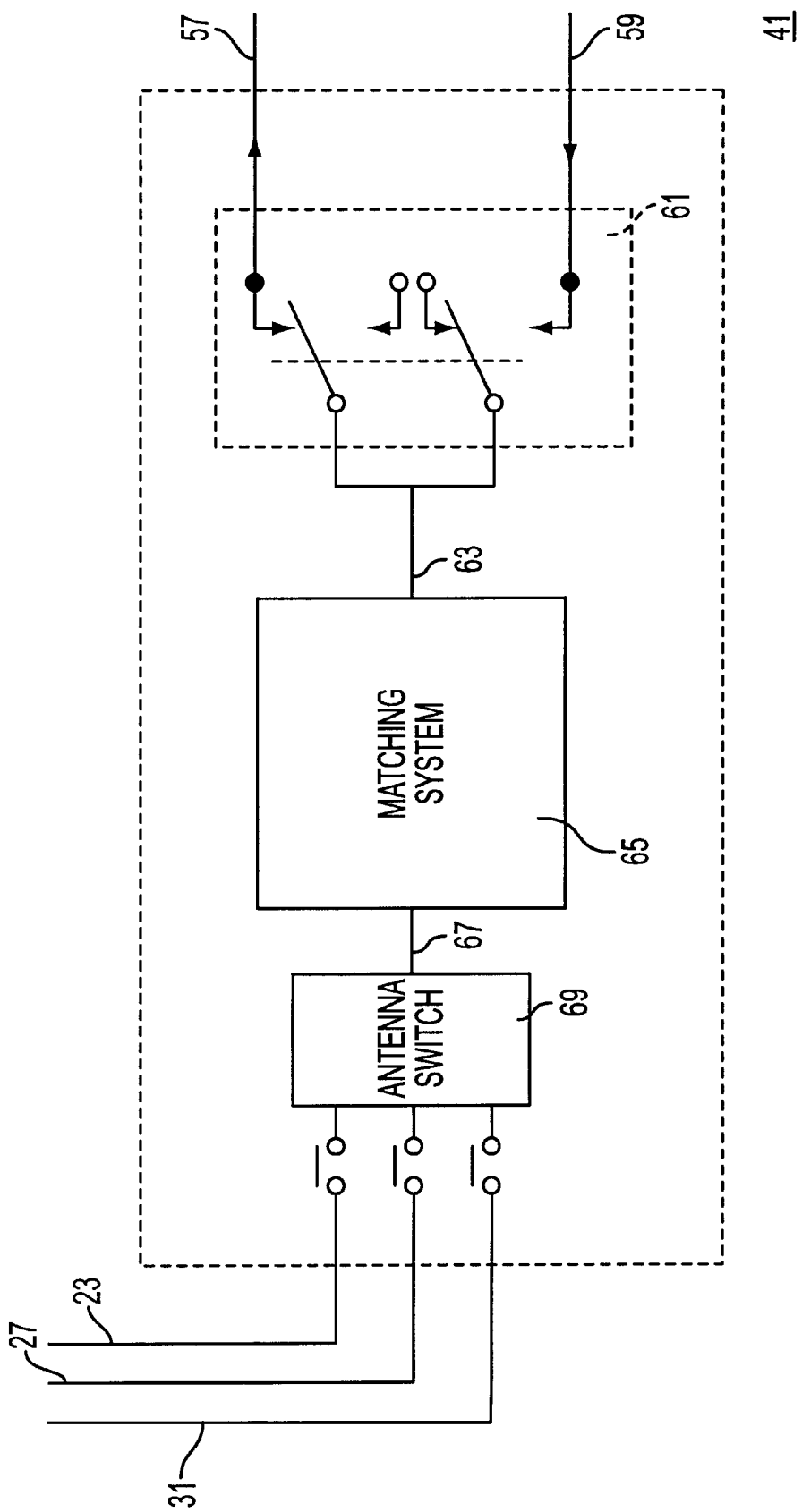
FIG. 4 is a schematic diagram of the antenna matcher shown in FIG. 3.

FIG. 4 is a block diagram of the antenna matcher of FIG. 3.

The input to the receiving section 43 is provided on a fourth conductor 57 and the output from the transmitting section 45 is received on a fifth conductor 59. A transmit receive switch 61, shown in broken outline, selects either the fourth conductor 57 or the fifth conductor 59 as the common input 63 to a matching system 65, further explained in relation to FIG. 5. The output 67 of the matching system 55 is coupled as input to an antenna switch 69, operative to select one or some of the first, second and third conductors 23, 27, 31 to be coupled to the output 67 of the matching system 65. Under some circumstances, only one of the first 23, second 27 and third 31 conductors will be so coupled. Under other circumstances, the controlling processor 35 may elect to couple a pair of the first, second and third conductors 23, 27, 31 to the output 67 of the matching system 65, and under yet further circumstances the controlling processor 35 may elect to couple all three of the first, second and third conductors 23, 27, 31 to the output 67 of the matching system 65.

Figure 5:
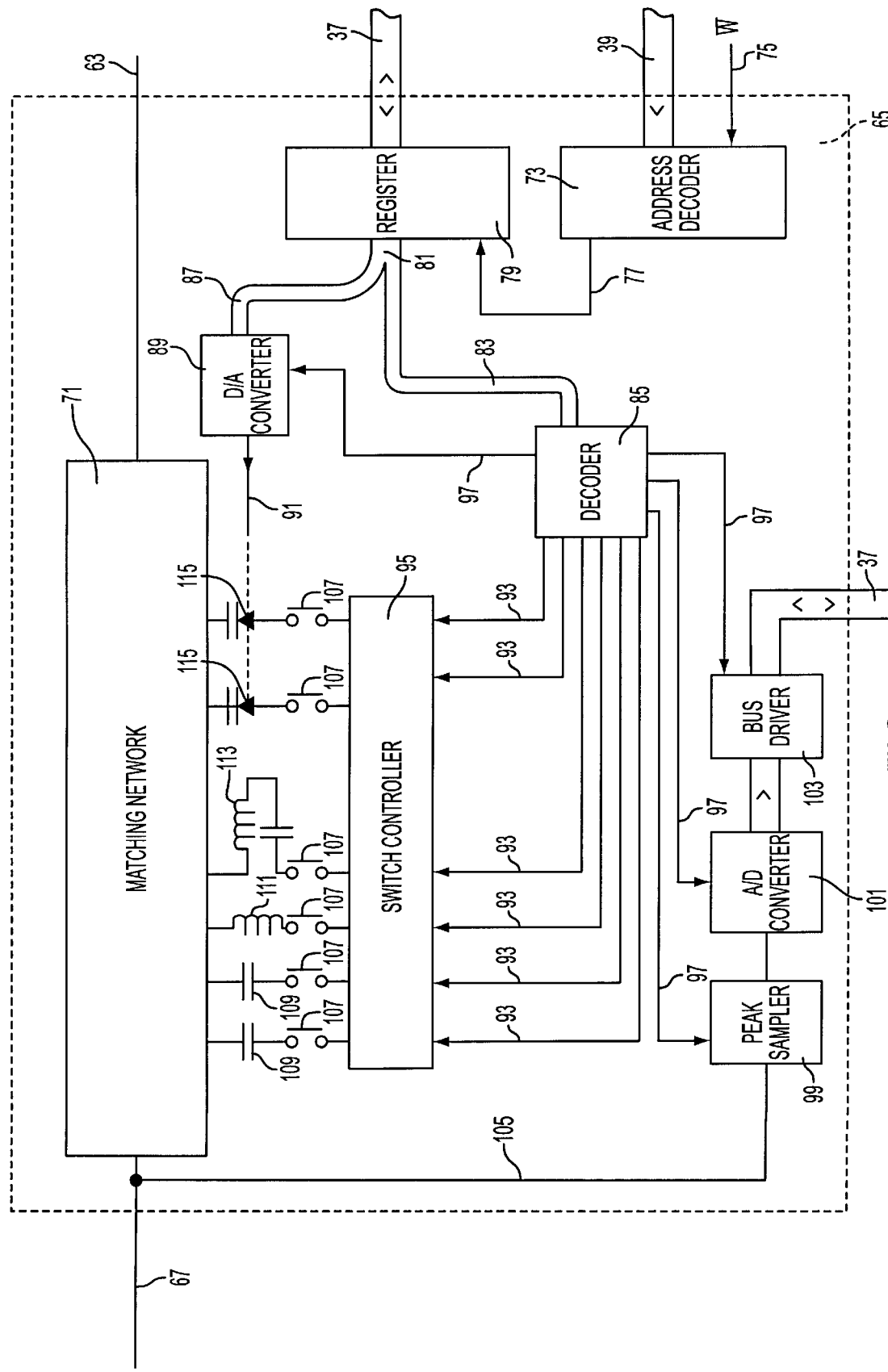
FIG. 5 is a schematic diagram of the matching system on FIG. 4.
Figure 6:
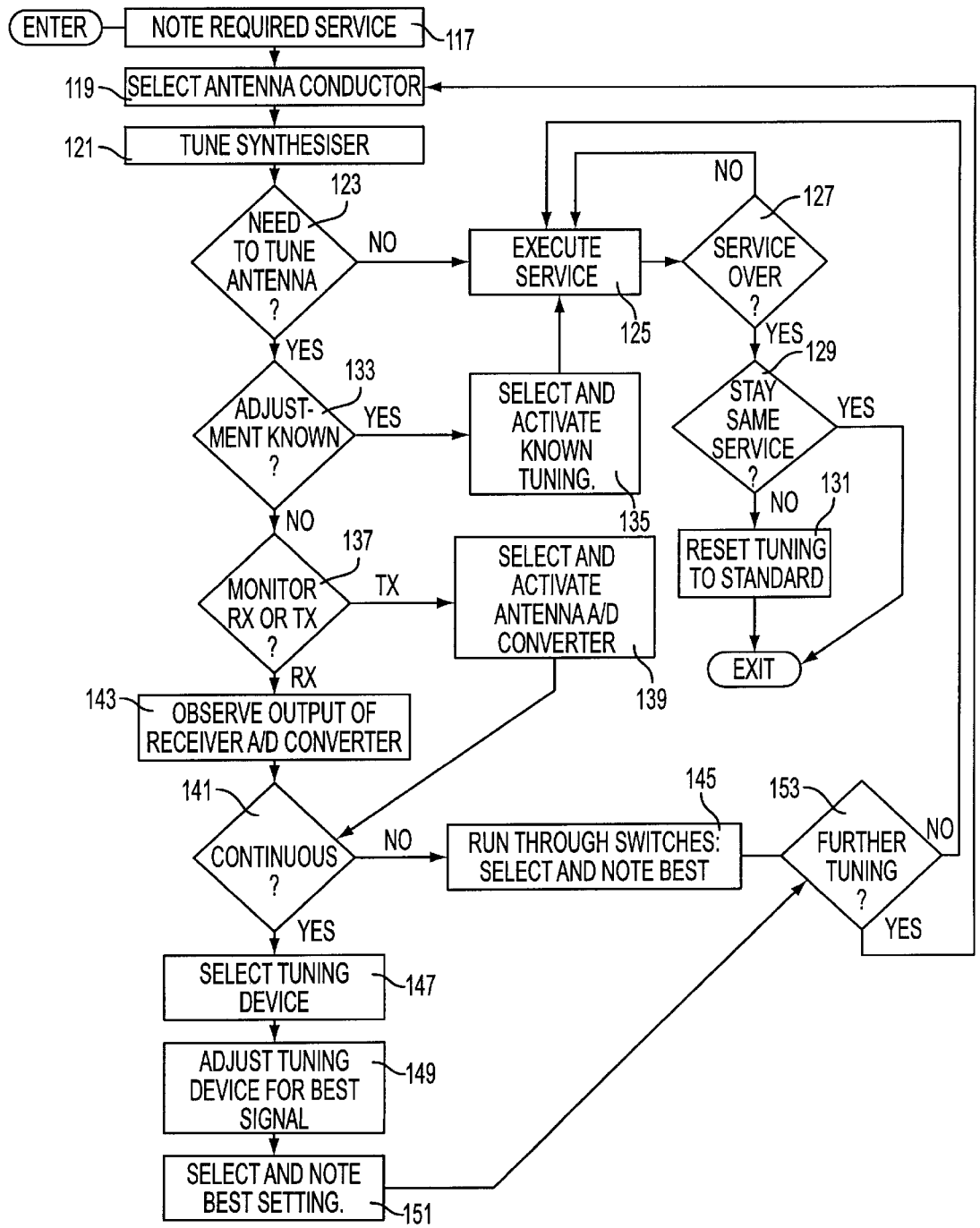
FIG. 6 is a flow chart of the activities of the controller of FIG. 3 in relation to the present invention.

It is to be understood that the operation of the transmit receive switch 61, the matching system 65 and the antenna switch 69 are all under control of the central processor either by direct control lines or, as will be shown as an example in relation to FIG. 5, via the data bus 37 and the address bus 39.

FIG. 5 is a block diagram of the matching system 65 of FIG. 4 and illustrates, in detail, one way in which the data bus 37 and the address bus 39 may be used to control the operation of all of the elements in the handset 1.

The common input 63 of the matching system 65 is coupled as input to a main matching network 71 and the output of the main matching network 71 is coupled as the output 67 of the matching system 65.

The address bus 39 is coupled as the input to an address decoder 73 which, when activated by a write line 75 from the controlling processor 35, compares the address given on the address bus 39 with a pre-determined address. If the address on the address bus 39 matches the pre-determined address, a signal is passed via a strobe line 77 to activate a register 79 to accept and store the data provided on the data bus 37 and to provide it as an output 81 which is maintained until the next occasion that the controlling processor 35 cares to address the matching system 65 with a new instruction.

A first portion 83 of the output 81 of the register 79 is coupled as an input to a command decoder 85. A second portion 87 of the output 81 of the register 79 is coupled as an input to a tuning digital-to-analogue converter 89. The output 91 of the tuning digital-to-analogue converter 89 is an analogue voltage representative of the instant value of the binary number provided on the second portion 87 of the output 81 of the register 79.

The command decoder 85 accepts the binary number on the first portion 83 of the output 81 of the register 79 and decodes it as individually selectable outputs provided as switch controls 93 to a switch controller 95, an output enable line 97 to the tuning digital-to-analogue converter 89, or as a series of enabling lines 97 to a peak sampler 99, an antenna analogue-to-digital converter 101 and a bus driver 103. When activated, the bus driver 103 provides input to the data bus 37. The input 105 to the peak sampler 99 is coupled to the output 67 of the matching system 65.

The switch controller 95 comprises a plurality of individually operable switches 107, responsive to the outputs 93 of the command decoder 85. The switches 107 are operative each to select a respective one from among a number of fixed components and variable components each operable to act upon the main matching network 71.

The manner of implementation of main matching network is at the discretion of designer. It is not a part of the present invention exactly how the main matching network 71 should be designed. It is sufficient that the common input 63 and the output 67 of the matching system 65 are collectively able, at the frequencies at which the antenna 3 is matched, to provide an adequate match between the antenna 3 and the user terminal 1.

As earlier stated, the switch controller 95 comprises a plurality of tuning adjusting switches 107, each selectively operable to connect individual components into the main matching network 71 to adjust the frequency at which an adequate match is obtained.

For example, the switch controller 95 may add, between selected points in the main matching network 71, one or more fixed capacitors 109, operative to change the matching frequency of the main matching network 71 as required. Alternatively, a fixed inductor 111 or a complex matching network 113 can be added.

The main matching network 71, may be as simple as a straightforward conductor, or may comprise delay lines, transmission lines, or complex arrangements of inductors and capacitors.

The fixed capacitors 109, the fixed inductors 111 and the complex networks 113 may equally be portions of transmission lines or micro-circuit strip lines capable of modifying the match between the user terminal 1 and the antenna 3 as required.

The peak sampler 99 monitors the voltage on the output 67 of the matching system 65, which is the input to the antenna 3. The controlling processor 35, by using the command decoder 85 to enable the peak sampler 99 and the antenna analogue-to-digital converter 101 and the bus driver 103, is operative to sample the peak voltage presented to the antenna 3 by the output of the matching system 65.

Likewise, if it is desired to sample the amplitude of a radio signal received by the receiving section 43, it is simply necessary for the controlling processor 35 to examine the output of the receiving analogue-to-digital converter 49 to determine what is the amplitude of the instantly received signal.

In addition to the fixed tuning elements, the fixed capacitor 109, the fixed inductors 111, and the complex networks 113, the switch controller 95 is also operative to connect into the main matching network 71, one or more variable tuning elements 115, in the form of varactor diodes. Those skilled in the art will also realise that other variable tuning elements are possible in this position, including inductors whose relative permeability is variable by means of DC imposed flux density etc. The output 91 of the tuning digital-to-analogue converter 89 is coupled as a capacitance varying input to the variable tuning element 115. By using the enabling line 97 from the command decoder 85 to permit the tuning digital-to-analogue converter 89 to control the variable tuning elements 115, in the form of varactor diodes, the switch controller 95 having caused the tuning adjusting switch 107 to connect them 115 into the main matching network 71, and by instructing the appropriate word on the second portion 87 of the output 81 of the register 79, the controlling processor 35 is operative to adjust the matching of the antenna 3 as required.

The switch controller 9S may switch in only one of the elements 109, 111, 113, 115, or may switch in two or more as required.

Likewise, the controlling processor 35 may adjust the matching of the antenna 3 by step selection of the fixed components 109, 111, 113 or by selection of the variable tuning elements and the adjustment of their value by means of the output 91 of the tuning digital-to-analogue converter 89.

FIG. 5 is a flow chart of the activity of the controlling processor 35.

A first activity 117 notes which service is required. In so doing, the controlling processor 35 is instructed which service is required by the service selection keys 13 on the keyboard 9.

Control then passes to a second activity 119 which operates the antenna switch 69 to select one, some or all to of the first, second and third conductors 23, 27, 31 in the antenna 3 to be coupled to the output 67 of the matching system 65.

Control then passes to a third activity 121 where the controlling processor 35 commands the synthesiser 47 to produce a frequency or frequencies appropriate to the selected service.

Control then passes to a first test 123 where a decision is made whether or not the antenna 3 requires to have its matching adjusted. The antenna 3 will not require to have its matching adjusted if the antenna 3 is matched and resonant on the frequency of the selected service. In the particular example chosen, the antenna 3 is operative for satellite communications without tuning. No tuning is therefore required. In the example chosen, although not matched, the antenna 3 has been found to be equivalent, without further matching to any normal GSM antenna in its effectiveness over a short range on the surface of the earth. For the sake of this example, it is presumed that other selected services do require the antenna 3 to have its matching adjusted.

If the first test 123 determines that no adjustment to the antenna 3 matching is required, control is passed to a fourth activity 125 where the service is executed, voice and data messages being transferred, until a second test 127 detects that the requirement for executing the service is over. Control is then passed to a third test 129 which makes the decision whether or not future operation will be for the same service. For example, the controlling processor 35 may opt for a default service. In this instance it is preferred that the default service is for satellite communications. Equally, the controlling processor 35 may elect to remain with the same service when next operated.

If the third test 129 determines that the controlling processor 35 wishes to remain with the same processor, the routine is exited and any matching adjustments done to the antenna 3 remain in place. If, however, the third test 129 determines that the default service will next be used, a fifth activity 131 resets all matching adjustments to the antenna 3 before exiting.

If first test 123 determined that the selected service required some matching adjustment to the antenna 3, control is passed to a fourth test 133 which decides whether or not the matching adjustment is already known.

For example, depending upon the selected service, a pre-determined fixed component might be selectable by the switch controller 95 to be added to the main matching network 71. Thus, for a particular service, the controlling processor 35 might instruct the switch controller 95 to select one of the fixed capacitors 109, or a fixed inductor 111, or a fixed complex network 113. The exact value of the fixed components can be adjusted during assembly of the handset 1 to suit the particular antenna 3 attached to the handset 1. Thereafter, antenna matching is achieved simply by selecting the fixed component 109, 111, 113. Alternatively, the controlling processor 35 may earlier have determined what adjustment is required to a selected variable tuning element 115 and, recollecting which tuning element 115 was selected and what output 91 was required from the tuning digital-to-analogue converter 89, is able, instantly, to return to that setting.

If the fourth test 133 determines that the matching adjustment is already known, control is passed to a sixth activity 135 in which the controlling processor 35 selects required matching adjustment. Control then passes back to the fourth activity 125 where the service is executed, as earlier described.

If the fourth test 133 determines that the matching adjustment of the antenna 3 is not already known, control is passed to a fifth test 137 which determines whether or not the antenna 3 is to be matched for transmitting or receiving mode. For example, in some services the transmitting and receiving frequencies are so close together that a single tuning will suffice. In other services the transmitting and receiving frequencies are so far apart that separate tuning is required for each.

If the fifth test 137 determines that the antenna 3 is to be matched for transmitting mode, control is passed to a seventh activity 139 where the controlling processor activates the peak sampler 99, the antenna digital-to-analogue converter 101 and the bus driver 103 to determine the amplitude of the voltage provided at the output 67 of the matching system 65. Control then passes to a sixth test 141. If the fifth test 137 determines that the antenna 3 is to be matched for receiving mode, control is passed to an eighth activity 143 where the controlling processor 35 monitors the output of the receiving analogue-to-digital converter 49 to determine the amplitude of the intermediate frequency signal delivered by the receiving section 43. Control then passes to the sixth test 141.

The sixth test 141 determines whether or not the antenna 3 requires continuous precise matching or merely approximate matching. If the sixth test 141 determines that the antenna requires only approximate matching, control is passed to a ninth activity 145 where the controlling processor 35 controls the switch controller 95 to select, in turn, single ones of the fixed components 109, 111, 113 and then, combinations thereof, until either an adequate amplitude is detected by the receiving analogue-to-digital converter 49 or the antenna digital-to-analogue converter 101, or the best (largest) amplitude is achieved. The controlling processor 35 then selects that fixed component 109, 111, 113, or combinations thereof, which give the best or acceptable signal.

When monitoring the output of the receiving section 43 through the receiving analogue-to-digital converter 49, it is possible to adjust the matching either for maximum amplitude of random noise (assuming no signal is received by the antenna 3) or to adjust the matching for maximum or adequate amplitude or any signal which happens to be received at that moment, by the antenna 3.

If the sixth test 141 determines that continuous and precise matching adjustment is required, control passes to a tenth activity 147 where the controlling processor 35 selects a variable tuning element 115, the output 91 of the tuning digital-to-analogue converter 89 being coupled as a controlling voltage to the variable element 115 in any one of numerous manners, known to those skilled in the art.

Control then passes to an eleventh activity 149 where the controlling processor 35 adjusts the output 91 of the tuning digital-to-analogue converter 89 and monitors, dependantly upon whether tuning is for receiving or transmission, either the output of the receiving analogue-to-digital converter 49 or the output of the antenna digital-to-analogue converter 101. Adjustment is made for peak output. If peak output cannot be achieved, another variable element 115 can be selected and adjustment re-attempted. If no peak is found, then an adequate selection is noted. Control then passes to a twelfth activity 151 where the best or adequate setting for the antenna is noted and selected.

Both the ninth activity 145 and the twelfth activity 151 pass control to a seventh test 153 which determines if any further matching adjustment may be necessary. For example, the service chosen may have its transmission and reception frequencies so close together that only one act of matching adjustment is required. In this instance, the seventh test passes control to the fourth activity 125 which executes the communication activity and exits as previously described. Equally, the selected service may have such diverse transmission and reception frequencies that separate matching adjustment is required, and both sets of matching adjustment have been completed. In this instance, control is also passed to the fourth activity 125. Alternatively, there may be a requirement for two acts of matching adjustment, one of which is not yet performed. In this instance, control is passed to the second activity 119 for the further act of matching adjustment to be completed.

In executing the fourth activity 125, the controlling processor 35, if widely separated transmission and reception frequencies are required, adjusts the matching of the antenna 3 to the transmission frequency (if required) when transmitting and to the reception frequency (if required) when receiving.

What is claimed is:

1. A user terminal for use in a communication system that includes a plurality of services provided on a plurality of frequencies, comprising a common antenna through which the user terminal can selectively access each of said plurality of services, said common antenna being arranged to be matched at the frequency of at least one of said plurality of services;

a selecting mechanism arranged to select between at least first and second operating modes, wherein, in said first operating mode said common antenna is operative as a matched antenna for at least one of said plurality of services, and in said second operating mode said common antenna is operative as an unmatched antenna for at least one other of said plurality of services;

a tuning mechanism responsive to the selection of at least one other of said plurality of services, said tuning mechanism comprises an electrically controllable element for altering the frequency at which said common antenna is matched towards the frequency of said at least one other of said plurality of services; and a controller operative to monitor the amplitude of signals on said common antenna, said controller being operative to generate a control signal in response to the amplitude of the signals on said common antenna, said control signal being coupled as a controlling input to said electrically controllable element, and said electrically controllable element being responsive to said control signal to move the frequency at which said common antenna is matched towards the frequency of said at least one other of said plurality of services.

2. A user terminal according to claim 1, wherein said selection of at least one other of said plurality of services includes use of a first frequency for radio reception and use of a second frequency for radio transmission, said tuning mechanism being operative to move the frequency at which said common antenna is matched towards said first frequency when said user terminal is in receiving mode and towards said second frequency when said user terminal is in transmission mode.

3. A user terminal according to claim 1, wherein said common antenna comprises plural conductors on a common former, and wherein said terminal comprises switches to select one or more of said plural conductors for use on a particular service.

4. A user terminal according to claim 1, wherein said tuning mechanism comprises an antenna matcher.

5. A user terminal according to claim 1, wherein said selecting mechanism includes a keypad, said keypad having a plurality of keys corresponding to the plurality of services for selecting one of said plurality of services.

* * * * *